United States Patent
Dolan

(10) Patent No.: US 11,389,900 B2
(45) Date of Patent: Jul. 19, 2022

(54) WELDING METHOD FOR HOLLOW AIRFOILS AND INTERMEDIATE BODY

(71) Applicant: United Technologies Corporation, Farmington, CT (US)

(72) Inventor: Robert C. Dolan, Coventry, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 82 days.

(21) Appl. No.: 16/847,062

(22) Filed: Apr. 13, 2020

(65) Prior Publication Data

US 2020/0346302 A1 Nov. 5, 2020

Related U.S. Application Data

(60) Provisional application No. 62/841,718, filed on May 1, 2019.

(51) Int. Cl.
| | |
|---|---|
| *B23P 15/04* | (2006.01) |
| *B23K 26/24* | (2014.01) |
| *F01D 5/18* | (2006.01) |
| *B23K 101/00* | (2006.01) |

(52) U.S. Cl.
CPC .......... *B23K 26/24* (2013.01); *F01D 5/18* (2013.01); *B23K 2101/001* (2018.08); *B23P 15/04* (2013.01); *F05D 2230/234* (2013.01)

(58) Field of Classification Search
CPC .......... B23C 2215/44; B23K 2101/001; B23K 2101/045; B23P 15/04; F05D 2230/23; F05D 2230/232–239
See application file for complete search history.

(56) References Cited

U.S. PATENT DOCUMENTS

| | | | |
|---|---|---|---|
| 6,039,542 A | 3/2000 | Schilling et al. | |
| 2012/0237351 A1 | 9/2012 | Weisse | |
| 2017/0023006 A1 | 1/2017 | Roche | |
| 2019/0040744 A1 * | 2/2019 | Bales | B23K 1/0018 |
| 2021/0276109 A1 * | 9/2021 | Kawai | B23C 5/10 |

FOREIGN PATENT DOCUMENTS

| | | | | |
|---|---|---|---|---|
| EP | 2589461 | | 5/2013 | |
| EP | 3441573 | | 2/2019 | |
| WO | WO-2019244361 A | * | 12/2019 | B23C 5/10 |

OTHER PUBLICATIONS

European Search Report for European Patent Application No. 20170117.4 completed Jun. 16, 2020.

* cited by examiner

*Primary Examiner* — Christopher J Besler
(74) *Attorney, Agent, or Firm* — Carlson, Gaskey & Olds, P.C.

(57) ABSTRACT

A method of forming an airfoil includes the steps of (a) providing an airfoil body with a hollow having at least one rib extending to an outer surface, and forming the outer surface of the rib to have at least one groove connecting a hollow pocket within a boundary defined by the rib to a location outwardly of the rib, (b) placing a cover over the hollow, and (c) welding the cover to the airfoil body, and such that the rib is welded to the blade cover. An intermediate airfoil body is also disclosed.

19 Claims, 2 Drawing Sheets

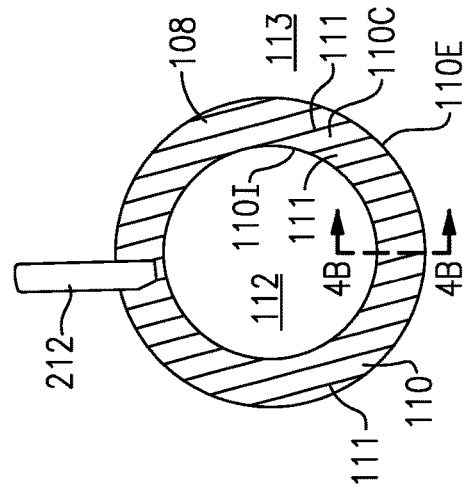
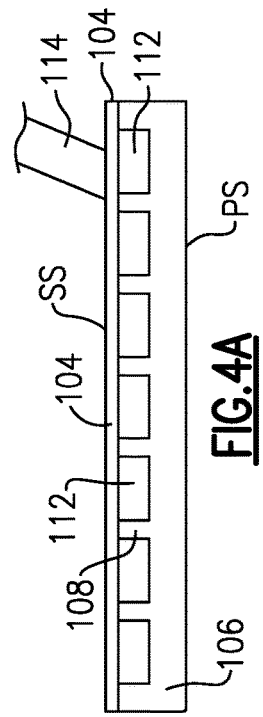
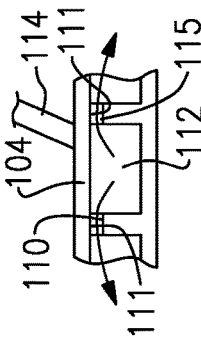
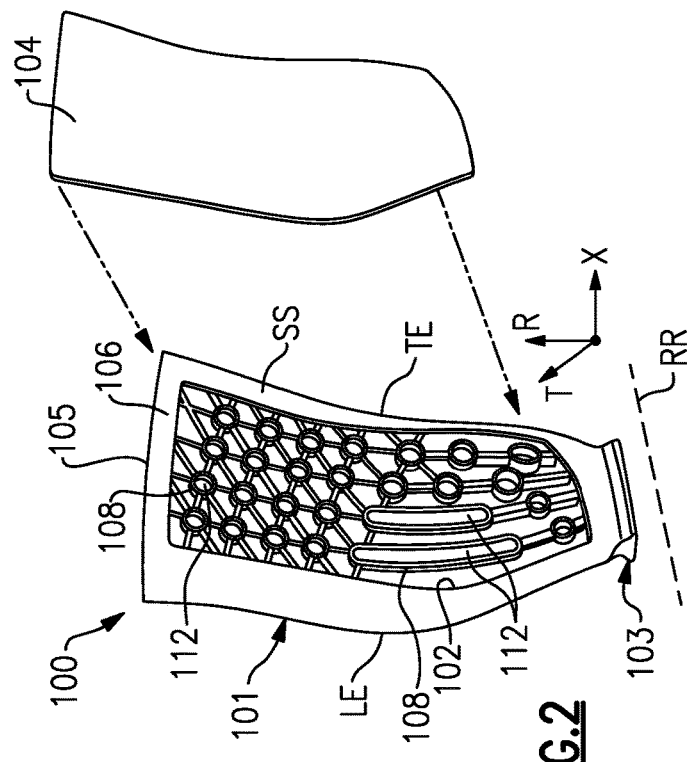
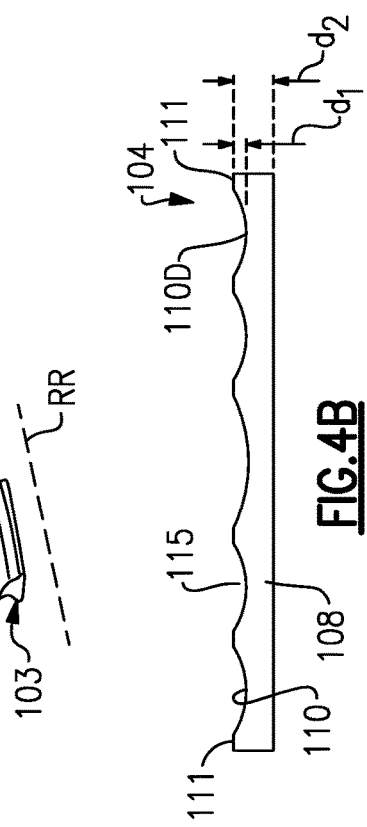
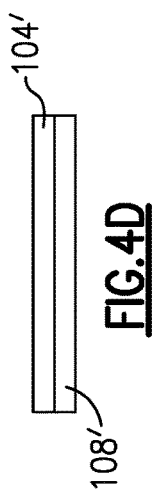

WELDING METHOD FOR HOLLOW AIRFOILS AND INTERMEDIATE BODY

CROSS-REFERENCE TO RELATED APPLICATION

This application claims priority to U.S. Provisional Application No. 62/841,718 filed May 1, 2019.

BACKGROUND

This application relates to a method of welding a cover over cavities within an airfoil body and an intermediate body.

Gas turbine engines are known and typically include a fan having a plurality of relatively large rotating fan blades delivering air into a bypass duct as propulsion air. The fan also delivers air into a compressor where it is compressed and delivered into a combustor. The compressed air is mixed with fuel and ignited in the combustor. Products of combustion pass downstream over turbine rotors, driving them to rotate.

There are a number of challenges for modern gas turbine engines. In particular, it is always desirable to reduce weight. Historically, the fan was driven at a common speed with a fan drive turbine. However, more recently, a gear reduction has been incorporated between the two such that the fan may rotate at slower speeds than the turbine driving the fan. With this change, fan rotors have increasingly large diameters. As the size of the fan blades increase, the weight also increases.

There is a good deal of effort made to reduce the weight of the fan blades. In particular, metallic bodies are formed with a plurality of cavities and a cover is welded over the cavities. While this is mentioned with regard to fan blades, such structures are also known at other locations within the gas turbine engine having airfoils.

SUMMARY

In a featured embodiment, a method of forming an airfoil includes the steps of (a) providing an airfoil body with a hollow having at least one rib extending to an outer surface, and forming the outer surface of the rib to have at least one groove connecting a hollow pocket within a boundary defined by the rib to a location outwardly of the rib, (b) placing a cover over the hollow, and (c) welding the cover to the airfoil body, and such that the rib is welded to the blade cover.

In another embodiment according to the previous embodiment, a portion of the rib is sacrificed during the welding process such that the groove is sacrificed and is not part of the airfoil after step (c).

In another embodiment according to any of the previous embodiments, there are a plurality of the grooves.

In another embodiment according to any of the previous embodiments, the grooves extend in a plurality of locations across an outer surface of the rib.

In another embodiment according to any of the previous embodiments, the rib is generally circular.

In another embodiment according to any of the previous embodiments, a groove depth is defined between an apex of the groove to a bottom most depth of the groove, with the depth being between 0.002-0.016 inches.

In another embodiment according to any of the previous embodiments, a groove depth is defined between an apex of the groove to a bottom most depth of the groove, with the depth being between 0.002-0.016 inches.

In another embodiment according to any of the previous embodiments, the welding step is laser welding.

In another embodiment according to any of the previous embodiments, the laser welding occurs in an inert gas environment.

In another embodiment according to any of the previous embodiments, the inert gas is an argon environment.

In another embodiment according to any of the previous embodiments, the airfoil body and the cover are formed of titanium alloys.

In another embodiment according to any of the previous embodiments, the at least one groove is formed into an outer surface of the rib by a ball end mill tool.

In another embodiment according to any of the previous embodiments, the rib is generally circular.

In another embodiment according to any of the previous embodiments, a groove depth is defined between an apex of the groove to a bottom most depth of the groove, with the depth being between 0.002-0.016 inches.

In another embodiment according to any of the previous embodiments, the welding step is laser welding.

In another embodiment according to any of the previous embodiments, the airfoil body and the cover are formed of titanium alloys.

In another embodiment according to any of the previous embodiments, the welding step is laser welding.

In another embodiment according to any of the previous embodiments, the at least one groove is formed into an outer surface of the rib by a ball end mill tool.

In another featured embodiment, an intermediate airfoil body including an airfoil shape has a hollow chamber including a plurality of ribs, with at least a portion of one of the ribs defining an interior space, and the one of the ribs includes at least one groove connecting an inner pocket surface within the one of the ribs to a location outward of the one of the ribs.

In another embodiment according to the previous embodiment, a groove depth is defined between an apex of the groove to a bottom most depth of the groove, with the depth being between 0.002-0.016 inches.

These and other features may be best understood from the following drawings and specification.

BRIEF DESCRIPTION OF THE DRAWINGS

FIG. 2 shows a fan blade.
FIG. 3 shows a manufacturing detail.
FIG. 4A shows a first assembly step.
FIG. 4B shows a feature during the FIG. 4A step.
FIG. 4C shows a detail of the FIG. 4A step.
FIG. 4D shows the FIG. 4B location after completion of the assembly method.

DETAILED DESCRIPTION

Figure 1:
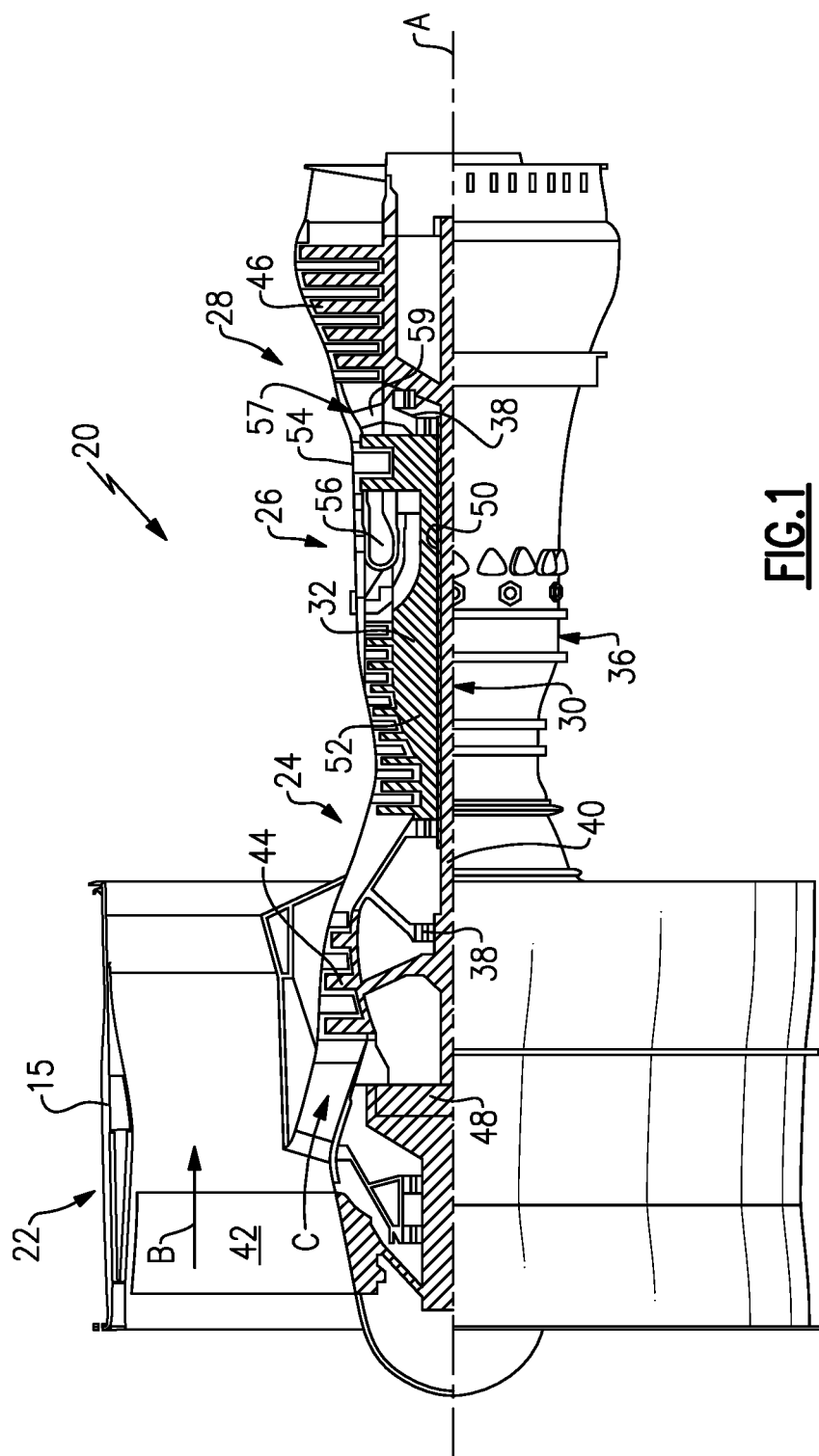
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

In a gas turbine engine, there is a good deal of effort to reduce the weight of the components. One particular component is an airfoil or fan blade such as fan blade 100 illustrated in FIG. 2. The fan blade 100 can be incorporated into the fan 42 or another portion of the engine 20 of FIG. 1, for example. Although the disclosure primarily refers to rotatable airfoils including fan blades, other gas turbine engine components may benefit from the teaching disclosed herein, such as static vanes, engine casings and other static components.

Referring to FIG. 2, the fan blade 100 includes an airfoil section 101 extending in a spanwise or radial direction R from a root section 103. The root section 103 is a shape that is configured to mount the fan blade 100 in the engine 20, such as a dovetail shape. Generally, one side of the airfoil section 101 is a suction side SS and the other side is a pressure side PS (FIG. 4A) separated in a thickness direction T. The pressure side PS can have a generally concave profile, and the suction side SS can have a generally convex profile. The airfoil section 101 extends in the thickness direction T between the pressure and suction sides PS, SS to define an aerodynamic surface contour of the airfoil section 101. The fan blade 100 is rotatable about an axis of rotation RR, which can be collinear or parallel to the engine axis A (FIG. 1).

The airfoil section 101 includes an airfoil body 106 that extends in the radial direction R from the root section 103 to a tip portion 105. The tip portion 105 is a terminal end of the fan blade 100. The airfoil body 106 extends in a chordwise direction X between a leading edge LE and a trailing edge TE. The airfoil body 106 defines at least one of the pressure and suction sides PS, SS. In the illustrated example of FIGS. 2 and 4A, the airfoil body 106 defines both the pressure and suction sides PS, SS.

The airfoil body 106 has a hollow 102 provided with a plurality of ribs 108 defining internal spaces or cavities 112. The ribs 108 provide rigidity or stiffness to the airfoil section 101. The ribs 108 can have various geometries, including elliptical and racetrack shaped geometries as illustrated in FIG. 2. One cavity 112 is shown in FIG. 3 as a generally elliptical or circular inner shape bounded or otherwise defined by an outer generally elliptical or circular rib 108. As known, a blade cover 104 is disposed on a surface of the airfoil body 106 to cover the hollow 102. The cover 104 is arranged to provide a continuous surface with the suction side SS of the fan blade 100, as illustrated by FIG. 4A. In another example, the cover 104 is disposed on the pressure side PS of the fan blade 100. The fan blade 100 can include two or more covers along each of the pressure and/or suction sides PS, SS of the airfoil section 101. Various techniques can be utilized for forming the ribs 108 and cavities 112, such as casting or machining.

In general, the airfoil body 106 and cover 104 may be formed of an appropriate material, in one example. The airfoil body 106 and cover 104 can be made out of metallic materials such as titanium or aluminum. Other materials for the airfoil body 106 and cover 104 can be utilized, including metals or alloys. In examples, the cavities 112 are hollow subsequent to attaching the cover 104 to the airfoil body 106. In other examples, the cavities 112 are at least partially filled with material which can differ from the material of the airfoil body 106 and/or cover 104.

FIG. 3 shows a detail of the circular rib 108. A ball end mill tool 212 cuts a plurality of cusps 110 between adjacent apices 111. As shown in this figure, there may be a regular series of cusps 110 and apices 111 across an entire surface area of the rib 108. In examples, each of the cusps 110 and apices 111 generally extend in a common direction having a major component in the radial or chordwise direction R, X (FIG. 2). The cusps 110 include cusp portions having an inlet 110I connecting the internal cavity 112 to an outlet 110E. The outlet 110E is connected to a location or space 113 outwardly of the rib 108. The space 113 can be a portion of the hollow 102 between adjacent ribs 108, for example. Each apex 111 can have a generally planar cross-sectional profile, and each cusp 110 can be bounded by a surface have a generally arcuate or concave cross-sectional profile sloping from the adjacent apices 111, as illustrated by FIG. 4B. In other examples, each cusp 110 has a generally rectangular cross-sectional profile.

FIG. 4A schematically shows a method of assembly. The cover 104 is placed over the ribs 108, and a laser welding tool 114 applies laser energy to the cover 104 to weld the cover 104 to the underlying rib 108. Generally, this may occur in an argon environment, although other inert gases may be utilized such as helium.

As shown in FIG. 4B, a first distance d1 or depth of the cusp 110 is defined from its deepest portion 110D to an adjacent apex 111. The first distance d1 can be between 0.002-0.016 inches, for example. The rib 108 defines a height or second distance d2 between the respective apex 111 and a floor of the adjacent cavity 112 (FIG. 3). In examples, a ratio of d1 to d2 is greater than 0.002, or more narrowly less than 0.5, such as between 0.0025 and 0.18.

Applicant has discovered that as the welding process occurs across the internal cavities 112, the pressure within the cavity 112 increases.

Here, the cusps 110 provide a pressure relief function. As shown, for example, in FIG. 4C, the cusps 110 provide a leakage space or gap 115 between the blade cover 104 and the rib 108. The apices 111 contact the cover 104.

Now, when the welding tool 114 is over a cavity 112, pressure can be relieved through the gaps 115 as shown schematically.

After the weld step, the distance between the apices 111 and the cusps 110 is sacrificed such that cover 104' sits flush on ribs 108' as shown in FIG. 4D.

The cusps 110 could be thought of as being grooves. While FIG. 3 shows the cusps 110 across the entire face of the rib 108, it should be appreciated that it may be possible to achieve the goals of this disclosure with a single groove, as long as it connects cavity 112 and space 113.

A method of forming an airfoil or fan blade 100 includes the steps of providing an airfoil body 106 with a hollow 102 having at least one rib 108 extending to an outer surface. An outer surface of the rib 108 is formed to have at least one groove or cusp 110 connecting a hollow pocket or internal cavity 112 within a boundary defined by the rib 108 to a location or space 113 outwardly of the rib 108. A cover 104 is placed over the hollow 102. The cover 104 is then welded to the blade body 106, and such that the rib 108 is welded to the blade cover 104.

While the method is shown with regard to a fan blade, it should be understood that these teachings could extend to other hollow airfoils having a cover.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A method of forming an airfoil comprising the steps of:
providing an airfoil body with a hollow having at least one rib extending to an outer surface of said at least one rib, and forming said outer surface of said at least one rib to have at least one groove connecting a hollow pocket within a boundary defined by said at least one rib to a location outwardly of said at least one rib;
placing a cover over said hollow;
welding said cover to said airfoil body, and such that said outer surface of said at least one rib is welded to said cover; and
wherein a portion of said at least one rib is sacrificed during the welding step such that said at least one groove is sacrificed and is not part of said airfoil after said welding step.

2. The method as set forth in claim 1, wherein said at least one groove includes a plurality of grooves.

3. The method as set forth in claim 2, wherein said plurality of grooves extend in a plurality of locations across said outer surface of said at least one rib.

4. The method as set forth in claim 2, wherein a cross section of said at least one rib is generally circular.

5. The method as set forth in claim 4, wherein a groove depth is defined between an apex of said at least one groove to a bottom most depth of said at least one groove, with said groove depth being between 0.002-0.016 inches.

6. The method as set forth in claim 2, wherein a groove depth is defined between an apex of said at least one groove to a bottom most depth of said at least one groove, with said groove depth being between 0.002-0.016 inches.

7. The method as set forth in claim 2, wherein said welding step is laser welding.

8. The method as set forth in claim 7, wherein said laser welding occurs in an inert gas environment.

9. The method as set forth in claim 8, wherein said inert gas is an argon environment.

10. The method as set forth in claim 7, wherein said airfoil body and said cover are formed of titanium alloys.

11. The method as set forth in claim 10, wherein said at least one groove is formed into said outer surface of said at least one rib by a ball end mill tool.

12. The method as set forth in claim 1, wherein a cross section of said at least one rib is generally circular.

13. The method as set forth in claim 12, wherein a groove depth is defined between an apex of said at least one groove to a bottom most depth of said at least one groove, with said groove depth being between 0.002-0.016 inches.

14. The method as set forth in claim 13, wherein said welding step is laser welding.

15. The method as set forth in claim 1, wherein said airfoil body and said cover are formed of titanium alloys.

16. The method as set forth in claim 1, wherein said welding step is laser welding.

17. The method as set forth in claim 1, wherein said at least one groove is formed into said outer surface of said at least one rib by a ball end mill tool.

18. The method as set forth in claim 3, wherein:
    said at least one rib surrounds a perimeter of said hollow pocket; and
    said at least one rib includes apices distributed along said outer surface of said at least one rib, and said plurality of grooves are established by a plurality of cusps between adjacent pairs of said apices;
    said placing step occurs such that said cover contacts said apices;
    said welding step includes welding said cover to said apices; and
    said plurality of grooves extend in a common direction across said outer surface of said at least one rib and extend from said perimeter of said hollow pocket.

19. The method as set forth in claim 18, wherein a cross section of said at least one rib is generally circular to establish said perimeter of said hollow pocket.

* * * * *